(12) United States Patent
Hu

(10) Patent No.: US 7,463,486 B1
(45) Date of Patent: Dec. 9, 2008

(54) TRANSPIRATION COOLING FOR PASSIVE COOLED ULTRA MOBILE PERSONAL COMPUTER

(75) Inventor: Xuejiao Hu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/762,913

(22) Filed: Jun. 14, 2007

(51) Int. Cl.
 *H05K 7/20* (2006.01)
 *F28F 7/00* (2006.01)
(52) U.S. Cl. ............... 361/699; 361/689; 361/705; 361/708; 361/715; 165/80.4
(58) Field of Classification Search ............... None
 See application file for complete search history.

(56) References Cited

U.S. PATENT DOCUMENTS 6,317,321 B1 * 11/2001 Fitch et al. ............... 361/700
6,859,364 B2 * 2/2005 Yuasa et al. ............... 361/687
7,324,340 B2 * 1/2008 Xiong ....................... 361/700
2006/0012958 A1 * 1/2006 Tomioka et al. ........... 361/699
2006/0208914 A1 * 9/2006 Liu et al. ................... 340/620
2007/0188675 A1 * 8/2007 Tsubokura et al. ......... 349/58
2007/0235309 A1 * 10/2007 Tsu .......................... 200/515

OTHER PUBLICATIONS

S. Kuwabara et al., "Water-Absorbing Characteristics of Acrylic Acid-Grafted Carboxmethyl Cellulose Synthesized by Photografting", Journal of Polymer Science, vol. 60, 1996, pp. 1965-1970.

* cited by examiner

*Primary Examiner*—Gregory D Thompson
(74) *Attorney, Agent, or Firm*—David L. Guglielmi

(57) ABSTRACT

In some embodiments, transpiration cooling for passive cooled ultra mobile personal computer is presented. In this regard, an apparatus is introduced having a plurality of integrated circuit device(s), a power source to power the integrated circuit device(s), a chassis to house the integrated circuit device(s) and the power supply, and a skin to cover the chassis, the skin comprising a waterproof layer configured to prevent water from contacting the integrated circuit device(s) and a water absorbent layer configured to absorb water. Other embodiments are also disclosed and claimed.

24 Claims, 2 Drawing Sheets

TRANSPIRATION COOLING FOR PASSIVE COOLED ULTRA MOBILE PERSONAL COMPUTER

FIELD OF THE INVENTION

Embodiments of the present invention generally relate to the field of passive cooled devices and, more particularly, to transpiration cooling for passive cooled ultra mobile personal computer.

BACKGROUND OF THE INVENTION

The demand for more powerful handheld electronic devices presents problems in keeping the devices from getting too hot to handle. Passive cooling solutions are preferred, because consumers tend to dislike the noise of a fan. Generally, a cooling solution is considered unacceptable if the skin temperature is allowed to exceed 45 degrees Celsius.

BRIEF DESCRIPTION OF THE DRAWINGS

The present invention is illustrated by way of example and not limitation in the figures of the accompanying drawings in which like references indicate similar elements, and in which.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
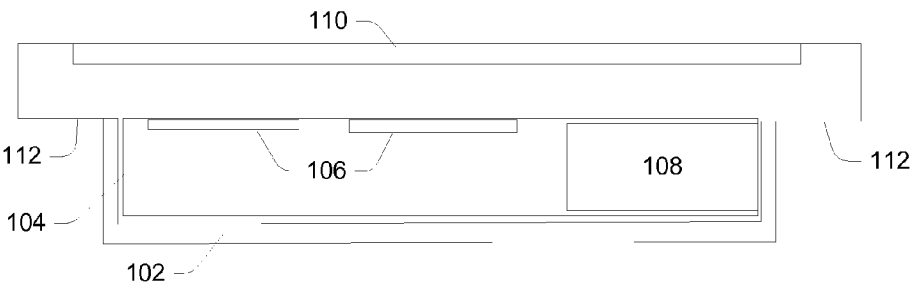
FIG. 1 is a graphical illustration of a cross-sectional view of an example passive cooled ultra mobile personal computer with transpiration cooling, in accordance with one example embodiment of the invention.

FIG. 1 is a graphical illustration of a cross-sectional view of an example passive cooled ultra mobile personal computer with transpiration cooling, in accordance with one example embodiment of the invention. As shown, ultra mobile personal computer 100 includes one or more of skin 102, chassis 104, integrated circuit devices 106, power supply 108, display 110, and surface 112.

Figure 2:
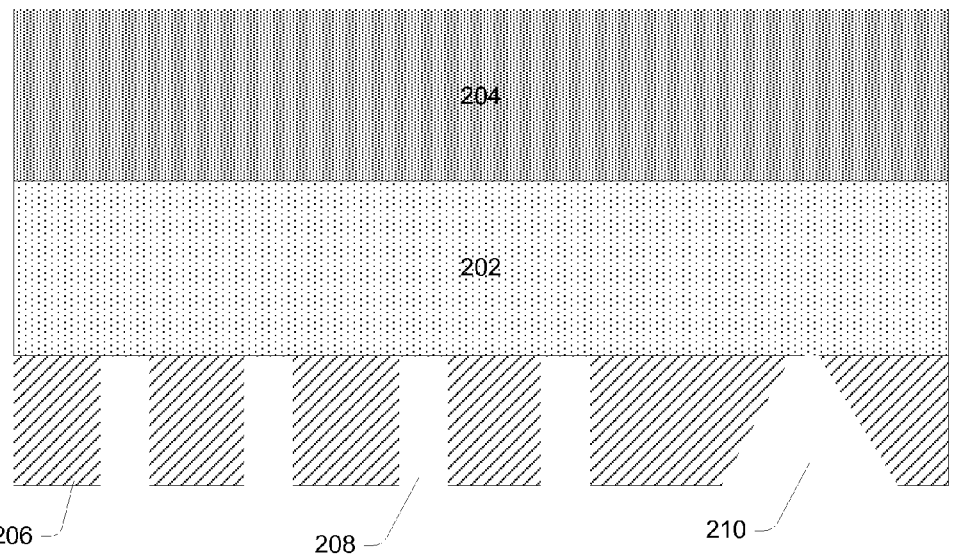
FIG. 2 is a graphical illustration of a cross-sectional view of the skin of the ultra mobile personal computer depicted in FIG. 1, in accordance with one example embodiment of the invention.

Skin 102, as described in greater detail in reference to FIG. 2, provides transpiration cooling for ultra mobile personal computer 100. In one embodiment skin 102 is configured to be held in a person's hand. Transpiration cooling, as used herein, is a cooling solution that removes heat through water evaporation, producing much better results than natural convection and radiation. While shown as surrounding chassis 104, skin 102 may directly contact integrated circuit devices 106 and/or power supply 108.

Chassis 104 represents a housing for integrated circuit devices 106 and power supply 108. Chassis 104 may be comprised of metal and may provide attachment points for a printed circuit board (not shown).

Integrated circuit devices 106 represent functional components ultra mobile personal computer 100 and may use several watts of electricity when fully functioning that becomes heat. Integrated circuit devices 106 may be coupled with heatsinks, not shown.

Power supply 108 may be a rechargeable battery that provides electricity to integrated circuit devices 106. Power supply 108 may have a charge that is depleted within a few hours of use, requiring a recharge.

Display 110 may be a liquid crystal display (LCD) that provides a graphical user interface for ultra mobile personal computer 100.

Figure 3:
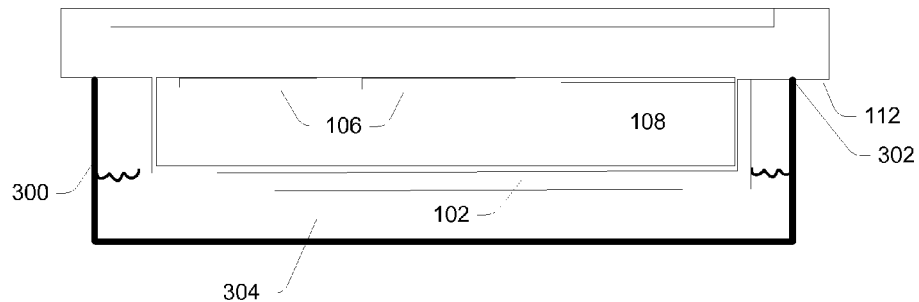
FIG. 3 is a graphical illustration of a cross-sectional view of the ultra mobile personal computer depicted in FIG. 1 coupled with a water source, in accordance with one example embodiment of the invention.

Surface 112 may be included in ultra mobile personal computer 100 to provide a support when coupled with a water source, as depicted in FIG. 3.

FIG. 2 is a graphical illustration of a cross-sectional view of the skin of the ultra mobile personal computer depicted in FIG. 1, in accordance with one example embodiment of the invention. In accordance with one example embodiment, skin 102 includes one or more of water absorbent layer 202 sandwiched between waterproof layer 204 and outer layer 206.

Water absorbent layer 202 represents a material or combination of materials capable of absorbing and at least temporarily holding water. In one embodiment, water absorbent layer 202 is a temperature sensitive hydro gel, such as the acrylic acid-grafted carboxymethyl cellulose described in *Water-Absorbing Characteristics of Acrylic Acid-Grafted Carboxymethyl Cellulose Synthesized by Photografting*, Shin Kuwabara and Hitoshi Kubota, Journal of Applied Polymer Science, Vol. 60, 1965-1970 (1996). In one embodiment, water absorbent layer 202 has a water absorbency that varies with temperature. In one embodiment, the water absorbency of water absorbent layer 202 is higher at lower temperatures and lower at higher temperatures with a significant drop in water absorbency at about 30 degrees Celsius. In one embodiment, water absorbent layer 202 is a sponge. Water absorbent layer 202 may be able to absorb water from ambient air or may need to have liquid water added to it.

As ultra mobile personal computer 100 is being used and the temperature of its internal components increases, skin 102 will also get warmer. Water previously absorbed in water absorbent layer 202 may then be released, either due to a decreased absorbency of water absorbent layer 202 or otherwise. This released water may then evaporate and thereby remove some heat from skin 102. In one embodiment, the thickness of water absorbency layer 202 is determined so as to provide a sufficient amount of water absorbency to ensure that the effects of transpiration cooling will be available at least until the battery would be expected to require a recharge. In one embodiment, water absorbency layer 202 is one millimeter thick.

Waterproof layer 204 prevents water from contacting integrated circuit devices 106 and power supply 108. In one embodiment, waterproof layer 204 is plastic. In another embodiment, waterproof layer 204 is metal. In one embodiment, waterproof layer 204 is integrated with chassis 104.

Outer layer 206 substantially covers water absorbent layer 202 and provides openings for water to move into and out from water absorbent layer 202. In one embodiment outer layer 206 is plastic. In another embodiment outer layer 206 is rubber. As shown, outer layer 206 includes micro-pores 208 and input opening 210. To prevent water from escaping from water absorbent layer 202 when ultra mobile personal computer 100 is not in use, outer layer 206 may include a cover (not shown) that may slide over or snap over the openings in outer layer 206.

Micro-pores 208 may have a diameter sufficiently large enough to allow water to pass through and sufficiently small enough to prevent portions of water absorbent layer 202 from passing through.

Input opening 210 may have a funnel-shaped opening to allow water to be more easily added to water absorbent layer 202. In one embodiment input opening 210 is configured to couple with a nozzle (not shown) of a water source.

FIG. 3 is a graphical illustration of a cross-sectional view of the ultra mobile personal computer depicted in FIG. 1 coupled with a water source, in accordance with one example embodiment of the invention. As shown, ultra mobile personal computer 100 is coupled with water source 300 containing water 304. Lip 302 of water source 300 supports surface 112 and thereby prevent ultra mobile personal computer 100 from entirely falling into water source 300. Water 304 is able to enter water absorbent layer 202 of skin 102 through openings in outer layer 206. Waterproof layer 204 prevents water 304 from contacting integrated circuit devices 106 or power supply 108.

Figure 4:
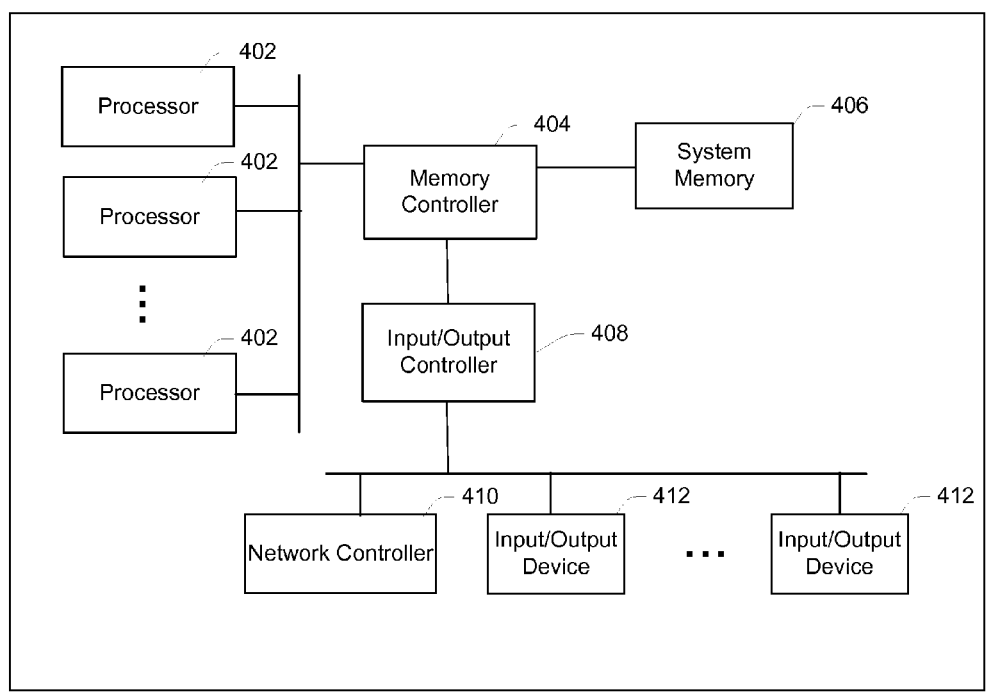
FIG. 4 is a block diagram of an example electronic appliance suitable for implementing transpiration cooling, in accordance with one example embodiment of the invention.

FIG. 4 is a block diagram of an example electronic appliance suitable for implementing transpiration cooling, in accordance with one example embodiment of the invention. Electronic appliance 400 is intended to represent any of a wide variety of traditional and non-traditional electronic appliances, laptops, cell phones, wireless communication subscriber units, personal digital assistants, or any electric appliance that would benefit from the teachings of the present invention. In accordance with the illustrated example embodiment, electronic appliance 400 may include one or more of processor(s) 402, memory controller 404, system memory 406, input/output controller 408, network controller 410, and input/output device(s) 412 coupled as shown in FIG. 4. Electronic appliance 400 may be enclosed with a skin described previously as an embodiment of the present invention.

Processor(s) 402 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect. In one embodiment, processors(s) 402 are Intel® compatible processors. Processor(s) 402 may have an instruction set containing a plurality of machine level instructions that may be invoked, for example by an application or operating system.

Memory controller 404 may represent any type of chipset or control logic that interfaces system memory 406 with the other components of electronic appliance 400. In one embodiment, the connection between processor(s) 402 and memory controller 404 may be referred to as a front-side bus. In another embodiment, memory controller 404 may be referred to as a north bridge.

System memory 406 may represent any type of memory device(s) used to store data and instructions that may have been or will be used by processor(s) 402. Typically, though the invention is not limited in this respect, system memory 406 will consist of dynamic random access memory (DRAM). In one embodiment, system memory 406 may consist of Rambus DRAM (RDRAM). In another embodiment, system memory 406 may consist of double data rate synchronous DRAM (DDRSDRAM).

Input/output (I/O) controller 408 may represent any type of chipset or control logic that interfaces I/O device(s) 412 with the other components of electronic appliance 400. In one embodiment, I/O controller 408 may be referred to as a south bridge. In another embodiment, I/O controller 408 may comply with the Peripheral Component Interconnect (PCI) Express™ Base Specification, Revision 1.0a, PCI Special Interest Group, released Apr. 15, 2003.

Network controller 410 may represent any type of device that allows electronic appliance 400 to communicate with other electronic appliances or devices. In one embodiment, network controller 410 may comply with a The Institute of Electrical and Electronics Engineers, Inc. (IEEE) 802.11b standard (approved Sep. 16, 1999, supplement to ANSI/IEEE Std 802.11, 1999 Edition). In another embodiment, network controller 410 may be an Ethernet network interface card.

Input/output (I/O) device(s) 412 may represent any type of device, peripheral or component that provides input to or processes output from electronic appliance 400.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. An apparatus configured to be held in a person's hand comprising:
   a plurality of integrated circuit device(s);
   a power source to power the integrated circuit device(s);
   a chassis to house the integrated circuit device(s) and the power supply; and
   a skin to cover the chassis, the skin comprising a waterproof layer configured to prevent water from contacting the integrated circuit device(s) and a water absorbent layer configured to absorb water.

2. The apparatus of claim 1, wherein the water absorbent layer comprises a temperature sensitive hydro gel.

3. The apparatus of claim 2, wherein the temperature sensitive hydro gel comprises an acrylic acid-grafted carboxymethyl cellulose.

4. The apparatus of claim 1, further comprising an outer layer including micro-pores configured to allow water to move into and out of the water absorbent layer, the outer layer substantially covering an outer surface of the water absorbent layer.

5. The apparatus of claim 4, further comprising a funnel-shaped opening in the outer layer for adding water to the water absorbent layer.

6. The apparatus of claim 4, further comprising an input port in the outer layer for coupling a water source to the water absorbent layer.

7. The apparatus of claim 4, further comprising an extending surface configured to rest on the lip of a water container to allow the water absorbent layer to be substantially submerged and to prevent the entire apparatus from falling into the water container.

8. An electronic appliance comprising:
   a network controller;
   a system memory;
   a processor; and
   a skin, the skin comprising a waterproof inner layer, a water absorbent middle layer, and an outer layer containing micro-pores.

9. The electronic appliance of claim 8, wherein the water absorbent middle layer comprises material with a water absorbency that is substantially temperature sensitive.

10. The electronic appliance of claim 8, wherein the water absorbent middle layer comprises a temperature sensitive hydro gel.

11. The electronic appliance of claim 10, wherein the temperature sensitive hydro gel comprises an acrylic acid-grafted carboxymethyl cellulose.

12. The electronic appliance of claim 10, wherein the hydro gel has a water absorbency that substantially changes at about 30 degrees Celsius.

13. The electronic appliance of claim 10, wherein the micro-pores in the outer layer comprise openings sufficiently large enough for water to pass through and sufficiently small enough to prevent the hydro gel from passing through.

14. An apparatus comprising:
   a plurality of integrated circuit device(s);
   a power source to power the integrated circuit device(s);
   a chassis to house the integrated circuit device(s) and the power supply; and
   a skin to cover the chassis, the skin comprising means for preventing water from contacting the integrated circuit device(s) and means for absorbing water.

15. The apparatus of claim 14, further comprising:
   means for covering the means for absorbing water; and
   means for allowing water transport to and from the means for absorbing water.

16. The apparatus of claim 14, wherein the means for absorbing water comprises means for absorbing water from ambient air.

17. The apparatus of claim 14, wherein the means for absorbing water comprises means for absorbing water at a temperature sensitive maximum absorbency.

18. The apparatus of claim 14, wherein the means for absorbing water comprises means for releasing absorbed water at a temperature of greater than about 30 degrees Celsius.

19. The apparatus of claim 14, further comprising means for coupling the apparatus with a water source.

20. An electronic appliance comprising:
   a network controller;
   a system memory;
   a processor; and
   a skin substantially covering the network controller, system memory and processor, the skin comprising a waterproof inner layer, a temperature sensitive hydro gel middle layer, and an outer layer containing micro-pores.

21. The electronic appliance of claim 20, wherein the temperature sensitive hydro gel is capable of absorbing more water at temperatures below about 30 degrees Celsius than at temperatures above about 30 degrees Celsius.

22. The electronic appliance of claim 20, further comprising a funnel-shaped opening in the outer layer for adding water to the temperature sensitive hydro gel.

23. The electronic appliance of claim 20, wherein the temperature sensitive hydro gel is capable of absorbing water from ambient air.

24. The electronic appliance of claim 20, further comprising an input port in the outer layer for coupling a water source to the temperature sensitive hydro gel.

* * * * *